United States Patent
Endo et al.

(10) Patent No.: US 12,515,691 B2
(45) Date of Patent: Jan. 6, 2026

(54) VEHICLE OPERATION DIAGNOSIS DEVICE

(71) Applicant: TOYOTA JIDOSHA KABUSHIKI KAISHA, Toyota (JP)

(72) Inventors: Masato Endo, Nagoya (JP); Motoshi Kojima, Toyota (JP); Shuhei Manabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 18/637,689

(22) Filed: Apr. 17, 2024

(65) Prior Publication Data

US 2025/0091598 A1    Mar. 20, 2025

(30) Foreign Application Priority Data

Sep. 19, 2023    (JP) ................. 2023-150784

(51) Int. Cl.
  *B60W 50/14*    (2020.01)
  *B60W 40/09*    (2012.01)
(52) U.S. Cl.
  CPC ............ *B60W 50/14* (2013.01); *B60W 40/09* (2013.01)
(58) Field of Classification Search
  CPC ............................. B60W 50/14; B60W 40/09
  See application file for complete search history.

(56) References Cited

U.S. PATENT DOCUMENTS

| | | | |
|---|---|---|---|
| 11,749,116 B1 * | 9/2023 | Young ................ | B60W 50/14 340/932.2 |
| 2016/0117926 A1 * | 4/2016 | Akavaram ......... | B62D 15/0285 340/932.2 |
| 2023/0174085 A1 | 6/2023 | Endo | |

FOREIGN PATENT DOCUMENTS

| | | | | |
|---|---|---|---|---|
| DE | 102022213674 A1 * | 8/2024 | ........ | B60W 60/0013 |
| JP | 2011-227883 A | 11/2011 | | |
| JP | 2012-254694 A | 12/2012 | | |
| JP | 2023-085099 A | 6/2023 | | |

* cited by examiner

*Primary Examiner* — Andrew W Bee
(74) *Attorney, Agent, or Firm* — SoraIP, Inc.

(57) ABSTRACT

The vehicle operation diagnosis device includes a processor and a memory, wherein the processor is configured to detect a predetermined operation scene of the vehicle based on data detected by the vehicle, acquire at least one of the number of retries of the vehicle operation in the operation scene and the time required for the vehicle operation in the operation scene as an evaluation index, and notify a pre-registered user of the evaluation result of the evaluation index or the operation capability of the driver based on the evaluation index.

6 Claims, 5 Drawing Sheets

VEHICLE OPERATION DIAGNOSIS DEVICE

CROSS-REFERENCE TO RELATED APPLICATION

This application claims priority to Japanese Patent Application No. 2023-150784 filed on Sep. 19, 2023, incorporated herein by reference in its entirety.

BACKGROUND

1. Technical Field

The present specification discloses a vehicle operation diagnosis device that diagnoses vehicle operation by a driver.

2. Description of Related Art

When a vehicle is operated, a driver needs to detect information on the surroundings, process the obtained information in the brain in a short time, determine a necessary operation, and execute the operation. Therefore, the state of the driver, in particular the cognitive ability, the judgment ability, and the reflex ability of the driver, can be grasped by analyzing the content of the vehicle operation by the driver.

Therefore, there has hitherto been known a technique for evaluating a vehicle operation by a driver. For example, Japanese Unexamined Patent Application Publication No. 2012-254694 (JP 2012-254694 A) discloses a technique of collecting the deceleration behavior of a vehicle since when a driver starts a brake operation until when the vehicle is stopped, and determining whether the driving ability of the driver has declined based on the deceleration behavior. In JP 2012-254694 A, the content of drive assist of the vehicle is changed according to the determination result.

SUMMARY

However, JP 2012-254694 A focuses on only a single operation, that is, the brake operation. In other words, JP 2012-254694 A does not take into account any difference in the surrounding environment of the vehicle. On the other hand, the content of the brake operation greatly differs depending on the difference in the surrounding environment of the vehicle. For example, while the braking distance of the vehicle is used as one of evaluation indices in JP 2012-254694 A, the braking distance becomes shorter when an obstacle suddenly appears in front of the vehicle, and becomes longer when the road surface is wet. In this manner, the deceleration behavior is greatly varied depending on the surrounding environment of the vehicle. Therefore, in order to detect variations in the driving ability of the driver only from the deceleration behavior, it is only necessary to collect data for a long period of time and observe long-term variations. In other words, it is difficult to quickly evaluate the state of the driver in the related art.

Therefore, the present specification discloses a vehicle operation diagnosis device capable of evaluating the state of a driver more quickly.

An aspect of the present specification discloses a vehicle operation diagnosis device including
a processor and a memory, in which
the processor is configured to:
detect an operation scene of a vehicle prescribed in advance based on data detected by the vehicle;
acquire, as an evaluation index, at least one of a number of retries of vehicle operation in the operation scene and a time required for the vehicle operation in the operation scene; and
notify a user registered in advance of the evaluation index or a result of evaluation of an operation ability of a driver based on the evaluation index.

According to the technique disclosed herein, it is possible to evaluate the state of a driver more quickly, since at least one of the number of retries of operation in a prescribed operation scene and the time required for the operation is acquired as an evaluation index.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
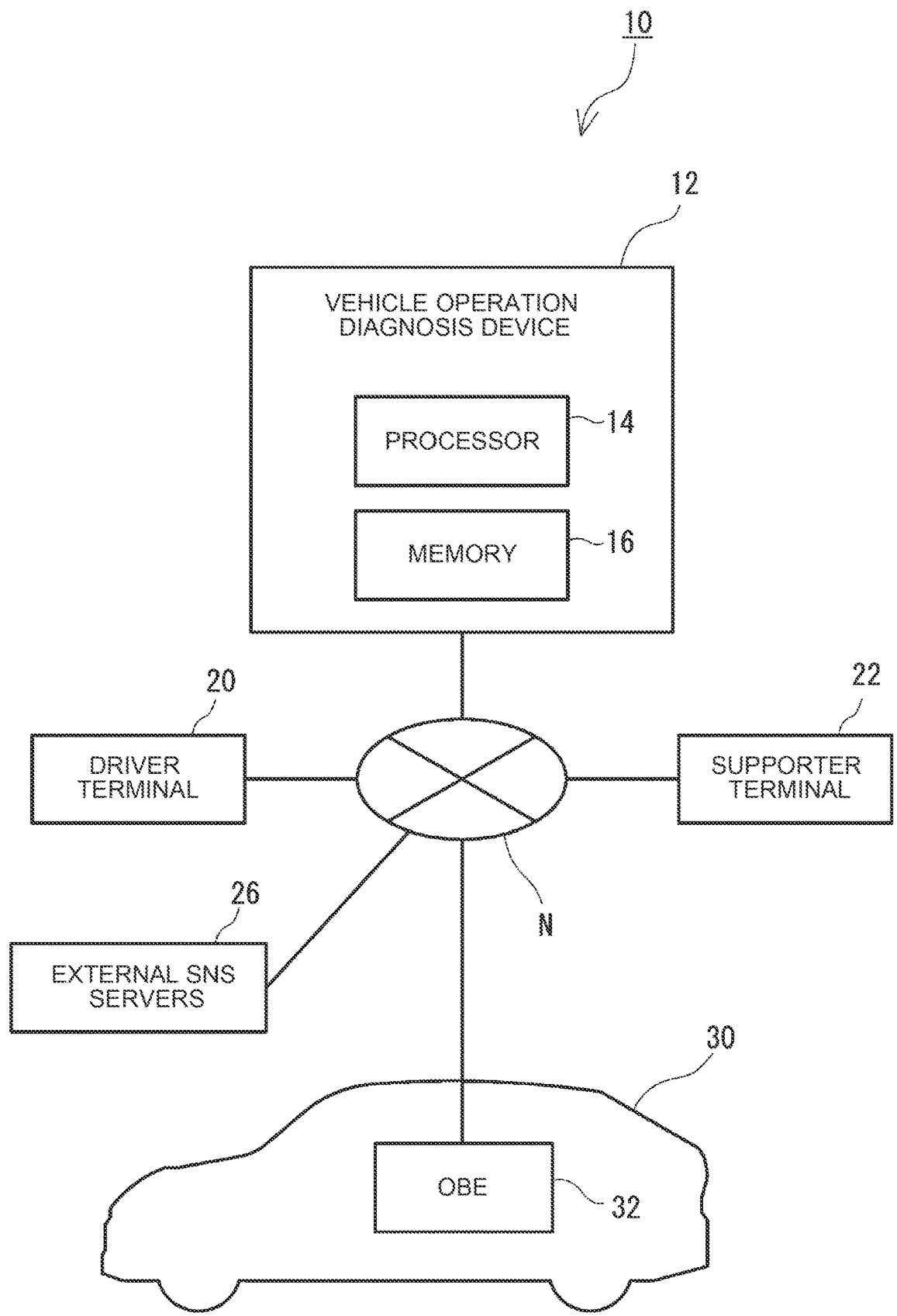
FIG. 1 is a diagram illustrating a configuration of a vehicle operation diagnosis system.

Hereinafter, the configuration of the vehicle operation diagnosis device 12 will be described with reference to the drawings. FIG. 1 is a diagram illustrating a configuration of a vehicle operation diagnosis system 10 in which a vehicle operation diagnosis device 12 is incorporated.

The vehicle operation diagnosis system 10 is a system for diagnosing a change in the driver's ability and the propriety of the vehicle driving based on the operation of the vehicle 30 by the driver. As illustrated in FIG. 1, the vehicle operation diagnosis system 10 includes a vehicle operation diagnosis device 12, a vehicle 30, a driver terminal 20, a supporter terminal 22, and external SNS servers 26.

The vehicle operation diagnosis device 12 is physically a computer having a processor 14 and a memory 16. Although the vehicle operation diagnosis device 12 is illustrated as a single computer in FIG. 1, the vehicle operation diagnosis device 12 may be configured by combining a plurality of computers that are physically separated from each other. In addition, at least one of a driver terminal 20, a supporter terminal 22, and a computer mounted on the vehicle 30, which will be described later, may be responsible for a part of the functions of the vehicle operation diagnosis device 12, which will be described in detail later.

The vehicle operation diagnosis device 12 processes data transmitted from the vehicle 30 via the network N to generate data related to the driver's ability. Further, the vehicle operation diagnosis device 12 transmits a message corresponding to the generated data to the driver terminal 20 and the supporter terminal 22. The details of the processing of the vehicle operation diagnosis device 12 will be described later.

The driver terminal 20 is an information terminal used by the driver, and is, for example, a personal computer or a smartphone. The supporter terminal 22 is an information terminal 24 used by the supporter, and is, for example, a personal computer or a smartphone. Here, the "supporter" is a person who supports a driver or receives consultation from a driver, as necessary. For example, the supporter is a family of a driver, a lover, a friend, or the like. For example, if the driver is an elderly person, the supporter may be a child of the driver who is concerned about the elderly driver. Also, if the driver is a young person who has not yet obtained a driver's license, the supporter may be the driver's parent. Further, if the driver is a professional driver (e.g., a taxi driver, a truck driver, etc.), the supporter may be an employer of the driver. The supporter and the driver correspond to a "user" who uses the vehicle operation diagnosis device 12. The vehicle operation diagnosis device 12 transmits a predetermined message to the driver terminal 20 and the supporter terminal 22 via the external SNS servers 26. The "message" is a message relating to the driver's ability, which will be described in detail later.

The vehicle 30 is a vehicle managed by a driver. The in-vehicle device 32 is mounted on the vehicle. The in-vehicle device 32 collects the operation contents of the driver and transmits the collection result to the vehicle operation diagnosis device 12 via the network N. The vehicle operation diagnosis device 12 calculates an evaluation index representing the driver's ability based on the received operation content.

Figure 2:
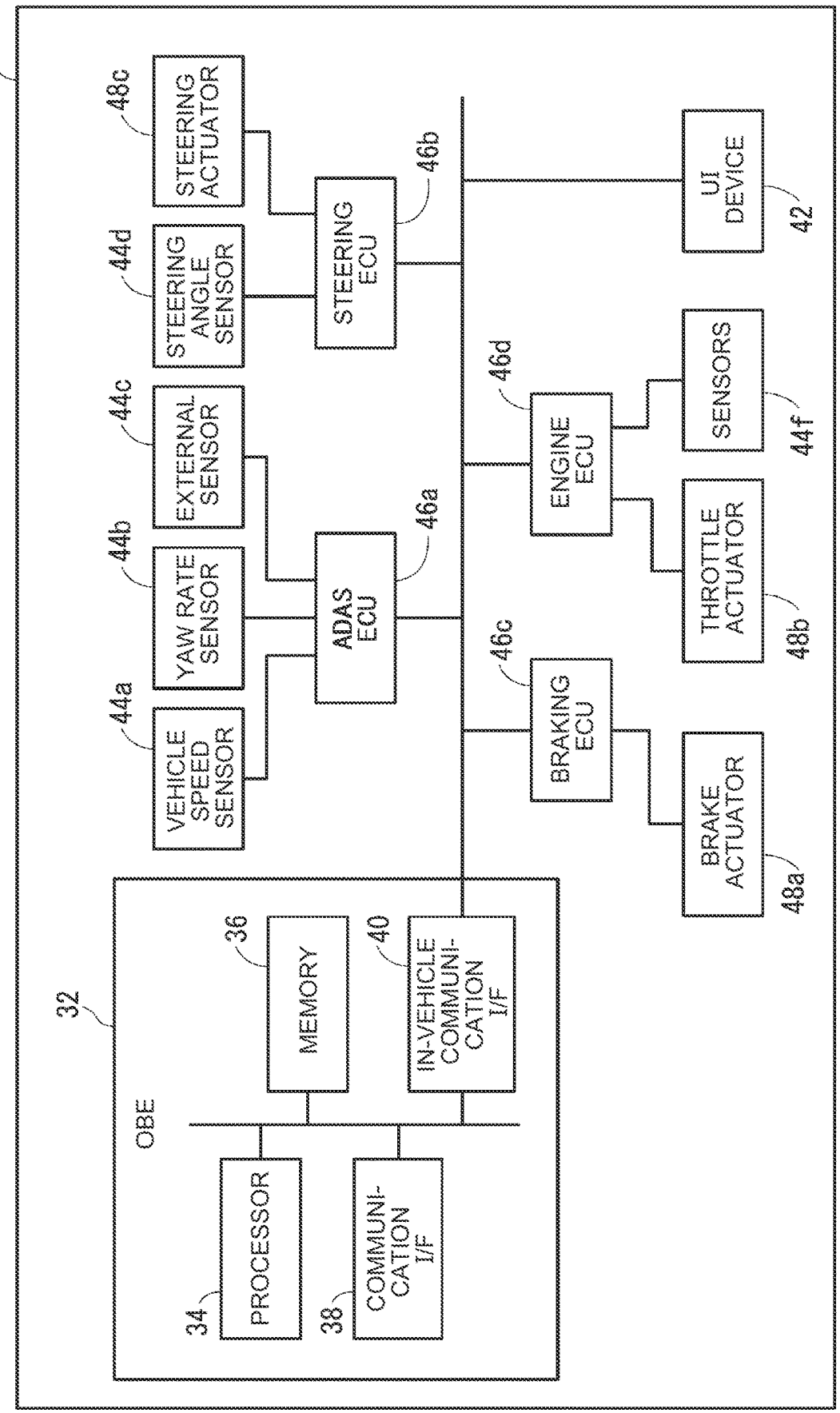
FIG. 2 is a diagram illustrating a configuration of a vehicle.

FIG. 2 is a block diagram illustrating a detailed configuration of the vehicle 30. As illustrated in FIG. 2, the in-vehicle device 32 of the vehicle 30 is a computer including a processor 34, memories 36, a communication I/F 38, and an in-vehicle communication I/F 40. The processor 34 shapes the data collected by the respective ECU 46 according to the programs recorded in the memory 36, and generates vehicle data. The communication I/F 38 is a radio communication module for communicating with the vehicle operation diagnosis device 12. As the radio communication module, for example, a communication standard such as 5G, LTE, Wi-Fi (registered trademark) is used. The communication I/F 38 transmits the vehicle data generated by the processor 14 to the vehicle operation diagnosis device 12.

The in-vehicle communication I/F 40 are interfaces for connecting to the respective ECU 46. As the in-vehicle communication I/F 40, for example, a CAN protocol-based communication standard is adopted.

The vehicle 30 further includes a plurality of actuators 48 for operating the vehicle 30 in response to an instruction from the driver, and a plurality of sensors 44 for detecting the state of the vehicle 30. The plurality of actuators 48 may include, for example, a braking actuator 48a, a throttle actuator 48b, and a steering actuator 48c. Further, the plurality of sensors 44 may include, for example, a vehicle speed sensor 44a, a yaw rate sensor 44b, an external sensor 44c, a steering angle sensor 44d, and an engine-related sensor 44f. Note that the external sensor 44c is a sensor group used for detecting the surroundings of the vehicle 30. The external sensor 44c may include, for example, a camera that captures an image of the surroundings of the vehicle 30, a millimeter wave radar that transmits a probe wave and receives a reflected wave, a LiDAR that scans the surroundings of the vehicle 30, and a GPS that detects the position of the vehicle 30. The sensor 44f may include an oil temperature sensor for measuring an oil temperature of the engine oil, a hydraulic pressure sensor for measuring a hydraulic pressure of the engine oil, and a rotational sensor for detecting a rotational speed of the engine.

The vehicle 30 is further equipped with a plurality of ECU 46. The plurality of ECU 46 may include, for example, an ADAS-ECU 46a, a steering ECU 46b, a braking ECU 46c, and an engine ECU. Connected to the respective ECU 46 are associated actuators 48 and/or sensors 44. ECU 46 controls the operation of the connected actuators 48 and transmits the data detected by the sensor 44 to the in-vehicle device 32 based on an instruction from the processor 34.

The vehicle 30 is further equipped with a UI device 42. UI device 42 is a device that receives an operation from a driver and presents information to the driver. UI device 42 includes, for example, an input device and an output device. The input device may include, for example, at least one of a switch, a touch panel, and a microphone. The output device may include, for example, at least one of a display and a speaker.

It should be noted that the present disclosure has been described. The configuration of the vehicle 30 is an example, and may be changed as appropriate. For example, the vehicle 30 may be an electrified vehicle having a motor as one of power sources. The vehicle 30 may further include a motor ECU for controlling the operation of the motor, a sensor for detecting the operation state of the motor, a battery ECU for controlling the operation of the battery, a sensor for detecting the charge/discharge state of the battery, and the like. In addition, the vehicle 30 may have an advanced driving support function or an automatic driving function that the vehicle 30 automatically executes part or all of the acceleration/deceleration control and the steering control.

Next, the processing contents of the vehicle operation diagnosis device 12 will be described. The vehicle operation diagnosis device 12 detects a predetermined operation scene of the vehicle 30 based on the data detected by the vehicle 30. Here, the term "operating scene" means that two or more vehicle operations are executed continuously or in parallel in a specific situation in order to achieve a short-term goal in the situation. For example, two or more operations for passing an intersection, changing lanes, merging lanes, entering a road from outside a road, passing a pause line, parking a parking lot, getting on a vehicle 30, getting off a vehicle 30, filling energy into the vehicle 30, switching from automatic driving to manual driving, and the like correspond to an "operation scene".

When the operation scene is detected, the vehicle operation diagnosis device 12 acquires at least one of the number of retries of the operation of the vehicle 30 and the time required for the operation of the vehicle 30 in the operation scene as an evaluation index. Then, the vehicle operation diagnosis device 12 notifies the driver terminal 20 and/or the supporter terminal 22 of the obtained evaluation index or the evaluation result of the operation capability of the driver based on the evaluation index under a condition registered in advance.

Several specific examples of the detection of the operation scene and the acquisition of the evaluation index will be described. As described above, the vehicle operation diagnosis device 12 detects an operation scene based on data transmitted from the vehicle 30. For example, a case where the operation scene is "passing through an intersection" will be described as an example. The vehicle operation diagnosis device 12 determines whether or not the vehicle 30 is passing through the intersection, for example, by analyzing the position information detected by GPS and the road condition in front of the vehicle detected by the camera or LiDAR.

When the vehicle 30 is passing through the intersection, the vehicle operation diagnosis device 12 acquires the number of retries of the vehicle operation related to the passage as an evaluation index. Here, the number of retries of the vehicle operation in passing through the intersection is the number of times of stopping and the number of times of backward movement of the vehicle 30 in an area of the intersection that should not be stopped. An area that should not be stopped is an area that obstructs the passage of other vehicles or pedestrians. This area which should not be stopped depends on whether the form of passage of the intersection is straight, right or left.

Figure 3:
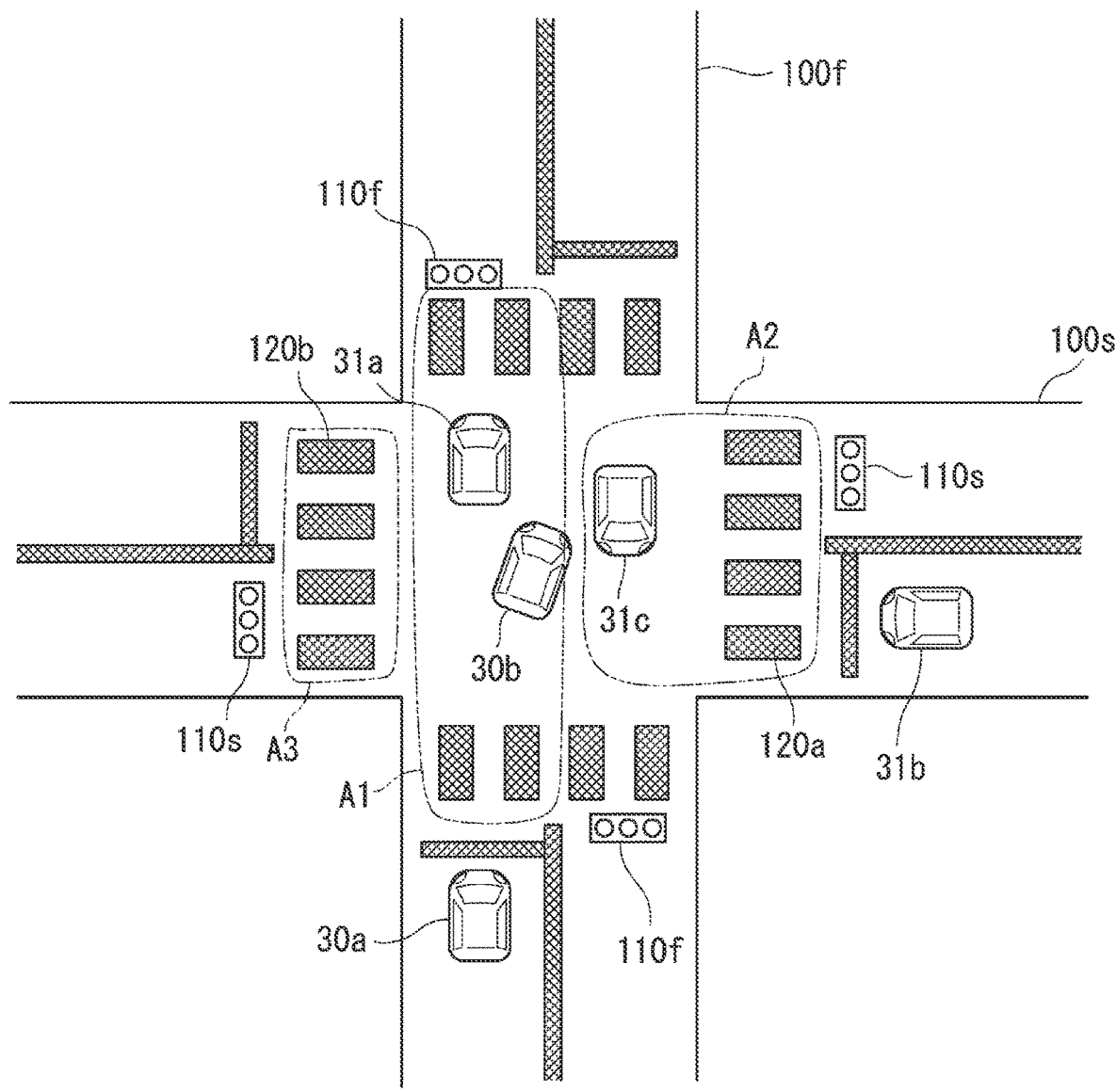
FIG. 3 is a schematic diagram illustrating an example of an operation scene of a vehicle.

This will be described with reference to FIG. 3. FIG. 3 is a schematic diagram illustrating an example of an operation scene of the vehicle 30. Note that FIG. 3 illustrates a case where the left-side travel of the vehicle 30 is defined.

For example, as illustrated in FIG. 3, a vehicle 30a passes straight through an intersection where the first road 100f and the second road 100s intersect with each other. In this context, 30a of vehicles should, of course, pass through the intersection at once, without stopping in the intersection. However, if the driver does not properly determine the surrounding conditions, the vehicle 30a may be stopped within the intersection.

For example, it is assumed that, when the road is congested, the vehicle 30a has entered the intersection following the preceding other vehicle 31a. In this case, due to the traffic jam, the vehicle 30a may not be able to move forward within the intersection and may be forced to pause. Furthermore, the vehicle 30a will significantly impede the passage of other vehicle 31b and pedestrians trying to travel straight on the second road 100s if the signaling 110s for the second road 100s changes from red to blue while the vehicle 30a remains paused. Therefore, when the vehicle 30a travels straight, the vehicle 31b that travels straight on the intersecting road and the area that obstructs the pedestrian's passage become "areas that should not be stopped" when the signal is switched. Usually, at the entrance of the intersection there is a stop line of the vehicle. When the vehicle 30a travels straight, the area inside the intersection (for example, the area A1 in FIG. 3) is the "area not to be stopped" than the stop line.

On the other hand, consider the case where the vehicle 30b turns right, that is, the case where the crossing point is bent across the other lane. In this case, the vehicle 30b often makes a right turn after temporarily waiting in the intersection in order to avoid a collision with the oncoming vehicle 31c traveling straight in the other lane. Therefore, in the case of a right turn, it is not a problem even if it is paused in the intersection. On the other hand, it is problematic if the vehicle 30b is stopped in such a position as to prevent the oncoming vehicle 31c from traveling straight in some circumstances. For example, if a vehicle 31b starts a right turn following a preceding vehicle, but is paused in the other lane or in a crosswalk 120a due to a traffic jam, it becomes a serious issue. Therefore, when the vehicle 30b bends across the opposite lane, the vehicle 31c traveling straight through the opposite lane and the area that obstructs the pedestrian's passage (for example, the area A2 in FIG. 3) are "areas that should not be stopped".

Further, a case where the vehicle 30 turns left, that is, a case where the vehicle bends at an intersection without crossing the opposite lane will be considered. When the vehicle 30 is stopped in the crosswalk 120b provided to be parallel to the first road 100f in the course of the left turn, the pedestrian crossing the crosswalk 120b is obstructed. Therefore, when the vehicle 30 bends at the intersection without crossing the opposite lane, the crosswalk 120b (that is, the area A3 in FIG. 3) provided parallel to the traveling road of the vehicle 30 becomes an "area not to be stopped".

As described above, the area where the vehicle 30 should not stop varies depending on the traveling direction of the vehicle 30. The vehicle operation diagnosis device 12 detects the number of times of pause and retreat in the area that should not be stopped as the number of retries.

Here, in order to avoid such retry, it is insufficient for the driver to confirm the signal, and it is necessary for the driver to observe the state of other vehicles and pedestrians, to predict the state of the short-term future, and to make a complicated judgment based on the prediction result. That is, it can be said that the number of retries when the vehicle 30 passes through the intersection greatly reflects the judgment ability and the cognitive ability of the driver. By acquiring the number of retries as the evaluation index, it is possible to more appropriately evaluate the ability of the driver.

In addition, the number of retries in passing through such an intersection is less susceptible to the surrounding traffic conditions. That is, as an index for evaluating the operating ability of the driver, it has been conventionally proposed to extract a single operation content such as a steering operation, a brake operation, and an accelerator operation. For example, conventionally, it has been proposed to extract the amount of sudden braking as an evaluation index of the driving capability. However, the presence or absence of sudden braking is often required regardless of the driver's driving ability. Therefore, even if the number of sudden brakes increases, it cannot be determined that the driver's driving capability has changed immediately. Of course, by observing the amount of the sudden braking over a long period of time, it is possible to estimate, to some extent, a change in the use tendency of the sudden braking and, consequently, a change in the driving capability of the driver. However, in order to make such an inference, long-term observation is required, so that it is not possible to quickly grasp the change in the driver's ability.

On the other hand, the above-described retry of passing through the intersection (i.e., pause or retraction in an area that should not be stopped) is a parameter that can be set to zero regardless of the traffic situation in the vicinity by the driver exerting an appropriate operation capability. Therefore, when the number of retries at the intersection is adopted as the evaluation index, it is possible to quickly grasp the change in the operation capability of the driver. As a result, by acquiring the number of retries passing through the intersection as the evaluation index, when there is a change in the operating ability of the driver, it is possible to quickly consider countermeasures, it is possible to prevent the occurrence of a serious problem.

Next, other operation scenes and evaluation indices will be briefly described. The operation scene may include, for example, at least one of a lane change, a lane merge, an approach from outside the road to the road, a passage of a pause line, and parking, as described above. The vehicle operation diagnosis device 12 determines the presence or absence of these operation scenes by analyzing, for example, position information detected by a GPS, a road condition in front of the vehicle detected by a camera or the like, a steering angle detected by a steering angle sensor 44d, and the like.

The vehicle operation diagnosis device 12 acquires the number of retries of the vehicle operation in these operation scenes as an evaluation index. Here, the retry in the lane change includes, for example, operating the steering so as to go to the lane of the lane change destination, and then re-cutting the steering so as to return to the lane of the lane change source. In addition, the lane merging is a case where the vehicle enters the expressway main line from the acceleration lane. The retry of the lane merging includes operating the steering so as to go from the acceleration lane to the expressway main line, and then re-turning the steering so as to return to the acceleration lane.

The entry from outside the road to the road includes, for example, entering the road from an area outside the road (for example, a parking lot facing the road) and then starting traveling along the road. The retry in this case is, for example, a temporary stop and a retreat at a position where the passage of the vehicle traveling on the road becomes obstructed in the process of entering the road from outside the road.

The pause line is a road sign indicating the obligation to pause the vehicle 30. In many cases, the pause line is set at the entrance of the intersection (including the T-path) without a signal. The retry in the passage of the pause line is the pause and the backward movement of the vehicle 30 at a position beyond the pause line.

When parking, the driver switches the position and direction of the vehicle to move the vehicle 30 into the parking lot. The retry in the parking is the number of times the vehicle 30 turns back from the arrival of the vehicle 30 at the adjacent position of the parking lot until the vehicle is completely parked. Note that the number of times of turning back varies greatly depending on the parking mode (parallel parking, vertical parking, or the like), the size of the parking lot, and the size of the space in front of the parking lot. In order to suppress variations in the number of retries (the number of times of turning over) due to such differences in the parking lot, when the number of times of parking retries is acquired as an evaluation index, the target parking lot may be limited to a predetermined parking lot. For example, at least one of a home parking lot, a work parking lot, and a parking lot of a commercial facility visiting frequently may be set as the target parking lot. The target parking lot may be automatically determined by the vehicle operation diagnosis device 12 based on the travel history of the vehicle 30, or may be designated by a user (driver or supporter). In addition, the number of times of turning-back in parking cannot be zero. Therefore, in the case of a parking scene, the relative magnitude of the actual number of turns with respect to the expected standard number of turns may be acquired as the evaluation index.

Alternatively, instead of or in addition to the number of retries in a specific operation scene, the time required for the vehicle operation in the specific operation scene may be acquired as the evaluation index. The time required for the vehicle operation is greatly increased or decreased depending on the place where the operation is performed. Therefore, when the required time is acquired as the evaluation index, it may be limited to a prescribed operation scene in a predetermined place. The specified location may be specified by the user or may be automatically determined by the vehicle operation diagnosis device 12.

For example, the operation scene for acquiring the required time as the evaluation index may include at least one of parking at a designated location, getting on and off at a designated location, energy filling to the vehicle 30 at the designated location, and switching from automatic driving to manual driving. In the case of parking, a time period from when the vehicle 30 arrives at an adjacent position of the target parking lot until when the vehicle is completely parked in the target parking lot is an evaluation index. In addition, in the case of riding on the vehicle 30 or getting off from the vehicle 30, the time from opening the door on the driver's seat side at the designated place until closing is an evaluation index.

Further, the time required for the energy filling operation to the vehicle 30 may be acquired as an evaluation index. For example, the working time for opening the lid of the energy filling port of the vehicle 30 and connecting a hose or cord for energy filling to the energy filling port may be acquired as an evaluation index in order to fill the energy. For example, when the vehicle 30 is a battery electric vehicle, the time from the opening of the lid of the charging port to the insertion of the charging connector into the charging port may be acquired as the evaluation index in the home parking lot or the prescribed charging station. In the case where the vehicle 30 is an engine vehicle, a time period from when the lid of the oil supply port is opened to when the oil supply hose is inserted into the oil supply port may be acquired as an evaluation index in a prescribed gas station. In addition, the work time after the end of the energy filling may also be acquired as an evaluation index. For example, a time period from when the filling hose or connector is removed from the filling port to when the lid of the filling port is closed may be acquired as the evaluation index.

When the vehicle 30 is an autonomous vehicle, most of the driving operation of the vehicle 30 is performed by the vehicle system. However, according to a change in the surrounding environment, the automatic driving may be canceled by the determination of the vehicle system. For example, if autonomous driving is allowed only on the highway and the vehicle 30 exits the highway, the vehicle system requests the driver to start manual driving. In addition, when some special situation occurs and it is difficult to continue the automatic driving, the vehicle system requests the driver to start the manual driving. In response to such a request, the driver starts manual driving. The time from the occurrence of the manual driving start request until the driver actually starts the manual driving operation may be acquired as the evaluation index.

When the above-described evaluation index is acquired, the vehicle operation diagnosis device 12 notifies the user of the evaluation result of the evaluation index or the operation capability of the driver based on the evaluation index. In the present embodiment, the vehicle operation diagnosis device 12 transmits a message related to the evaluation index to the driver terminal 20 and the supporter terminal 22 via the external SNS servers 26 as social media messages.

For example, the vehicle operation diagnosis device 12 may periodically calculate an evaluation score of the operation capability of the driver based on the obtained evaluation index, and notify the user of the evaluation score. In this case, the higher the numerical value of the table index (that is, the larger the number of retries or the larger the required time), the lower the evaluation score may be. Further, the calculation cycle of the evaluation score may be freely set as appropriate, for example, one day, one week, one month, or the like.

Further, such an evaluation score may be calculated separately for each operation scene. For example, the evaluation score corresponding to the intersection passage and the evaluation score corresponding to the parking may be calculated independently of each other. In this case, for example, the obtained evaluation index may be normalized for each operation scene. As the normalization, for example, the evaluation score may be calculated based on a value obtained by dividing the total value of the obtained evaluation indices by the number of appearances of the target operation scene within the calculation cycle of the evaluation score (for example, within one week).

In addition, one evaluation score may be calculated in a plurality of types of operation scenes. For example, one evaluation score may be calculated based on the number of retries in passing the intersection and the number of retries in parking. For example, a value obtained by weighting and adding an evaluation index normalized for each operation scene by a predetermined coefficient may be calculated as an evaluation score.

Figure 4:
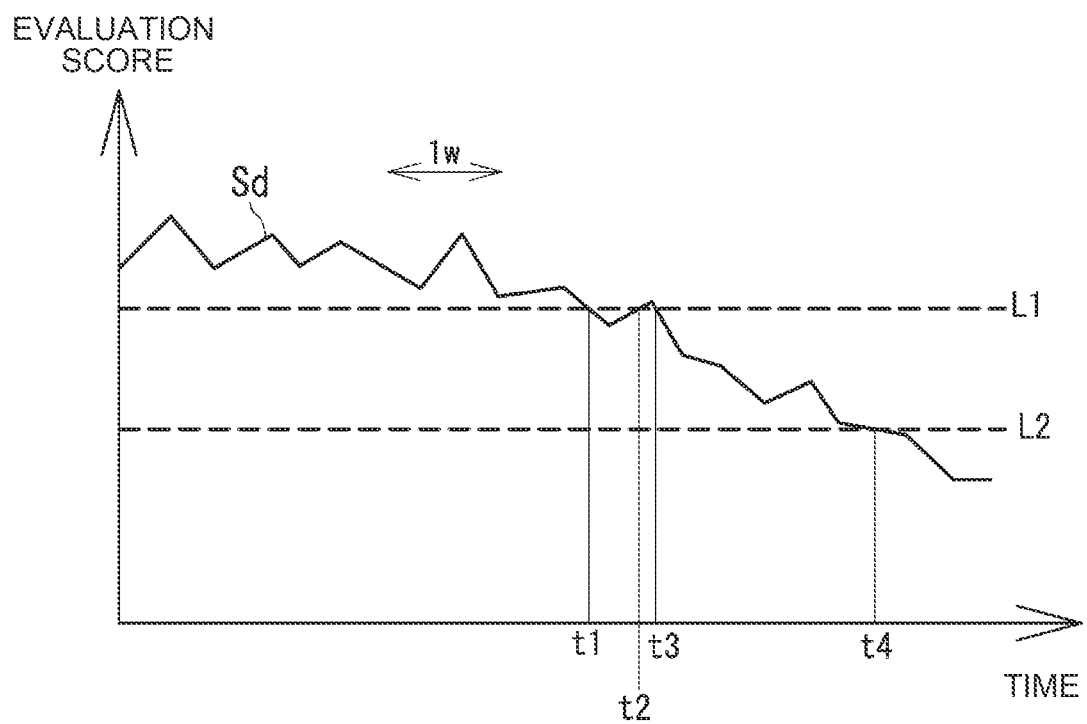
FIG. 4 is a diagram illustrating an example of a graph of an evaluation score.

Further, the vehicle operation diagnosis device 12 may notify the user of the obtained evaluation score itself. Alternatively, the vehicle operation diagnosis device 12 may generate a graph indicating a change history of the obtained evaluation score, and transmit the graph to the driver terminal 20 and the supporter terminal 22. FIG. 4 is a diagram illustrating an exemplary graph of such an assessment score Sd. In FIG. 4, "1w" indicates a duration of one week. As is clear from FIG. 4, by notifying the change history of the evaluation score Sd, the user can more clearly grasp the change in the operating capability of the driver. For example, in the case of FIG. 4, it can be seen that in the vicinity of the timing t3, the evaluation score Sd and thus the operating capability of the driver start to rapidly decrease. Thus, the driver and the supporter can quickly notice the change in the physical condition of the driver.

In addition, the vehicle operation diagnosis device 12 may notify the user of a comparison between the evaluation score Sd and other reference values. The reference value may be, for example, a general reference value set independently of the evaluation index of the driver. For example, the general reference value may be an average value of the evaluation scores of the general driver. Further, the general reference value may be an evaluation score that is estimated to be highly likely to cause an accident. In FIG. 4, as the reference value, a mean value L1 of the evaluation scores of the driver and the driver of the same age and a risk score L2 that is highly likely to lead to an accident are adopted. As described above, by comparing the driver's evaluation score Sd with the generic reference value L1, L2, the propriety of the driver's operational capability can be determined more clearly. When the driver is unsuitable for the driving operation of the vehicle, some countermeasures can be taken immediately, and the occurrence of an accident can be effectively prevented.

Figure 5:
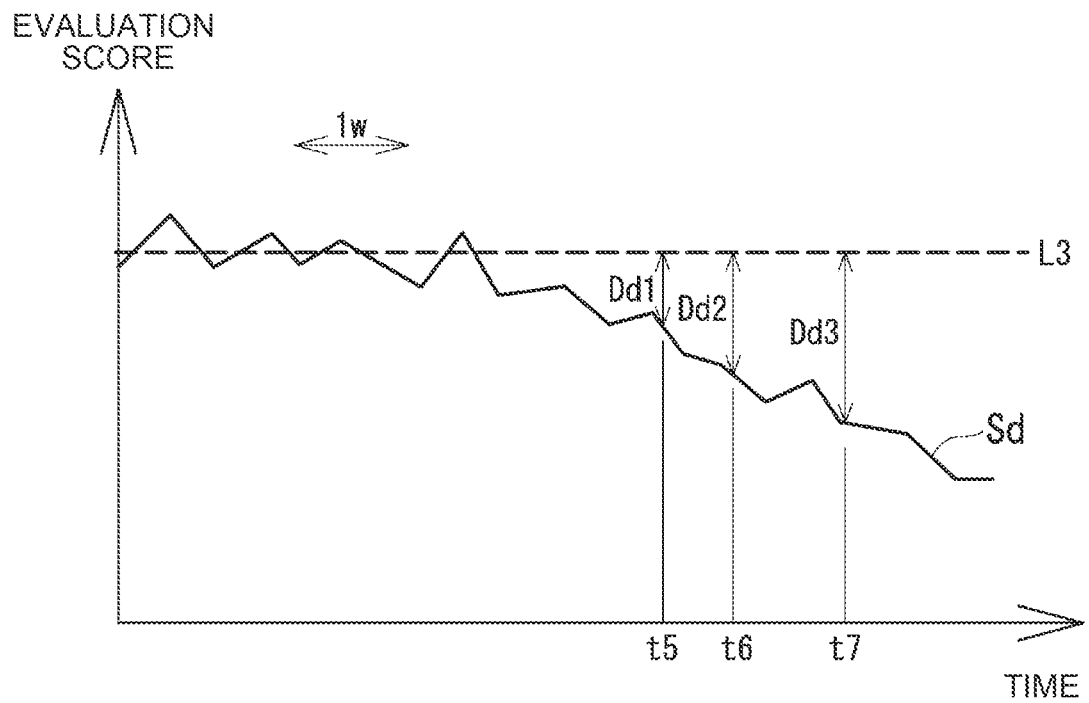
FIG. 5 is a diagram showing another example of a graph of an evaluation score.

In addition, the reference value compared with the evaluation score Sd of the driver may be a self-reference value set based on the evaluation index of the driver acquired in the past. FIG. 5 is a diagram illustrating an example in which a mean value L3 of the driver's evaluation scores in the previous year is adopted as the reference value. In this way, by adopting the past evaluation score of the driver as the reference value, it is possible to more clearly determine the change in the operating capability of the driver. Here, when the operating ability of the driver is significantly lower than in the past, there is a high possibility that some problem has occurred in the physical condition of the driver. In this case, the driver can effectively prevent further deterioration of the physical condition by taking measures such as receiving a medical examination from a doctor. That is, by adopting the past evaluation score of the driver as the reference value, it is possible to detect the change in the physical condition of the driver at an early stage, and thus it is possible to effectively prevent the deterioration of the physical condition of the driver.

In addition, the vehicle operation diagnosis device 12 may compare the driver's assessment score Sd with such a reference value L1, L2, L3. Then, the vehicle operation diagnosis device 12 may transmit, to the driver terminal 20 and the supporter terminal 22, a message prompting attention at a timing when the evaluation score Sd straddles the reference value L1, L2, L3 in the decreasing process. For example, in the case of the example of FIG. 4, the vehicle operation diagnosis device 12 may transmit a message for prompting attention to the driver terminal 20 and the supporter terminal 22 at the timing of the timing t1, t3, t4, respectively. In addition, the vehicle operation diagnosis device 12 may transmit, to the driver terminal 20 and the supporter terminal 22, a message that praises the improvement of the operation capability at a timing when the evaluation score Sd straddles the reference value L1, L2, L3 in the increase process. In the example of FIG. 4, the vehicle operation diagnosis device 12 may transmit a message to the driver terminal 20 and the supporter terminal 22 at the timing of the timing t2 to admire the operation capability restoration.

Further, as another form, the vehicle operation diagnosis device 12 may transmit a message prompting attention to the driver terminal 20 and the supporter terminal 22 at a timing when the difference value between the driver's evaluation score Sd and the reference value L1, L2, L3 becomes equal to or larger than a prescribed allowable value. For example, in the example of FIG. 5, the vehicle operation diagnosis device 12 may transmit a message prompting attention to the driver terminal 20 and the supporter terminal 22 at the timing of the timing t5, t6, t7 when the difference between the evaluation score Sd and the historical mean value L3 exceeds the first allowable value Dd1, the second allowable value Dd2, and the third allowable value Dd3, respectively. It is Dd1<Dd2<Dd3.

Figure 6:
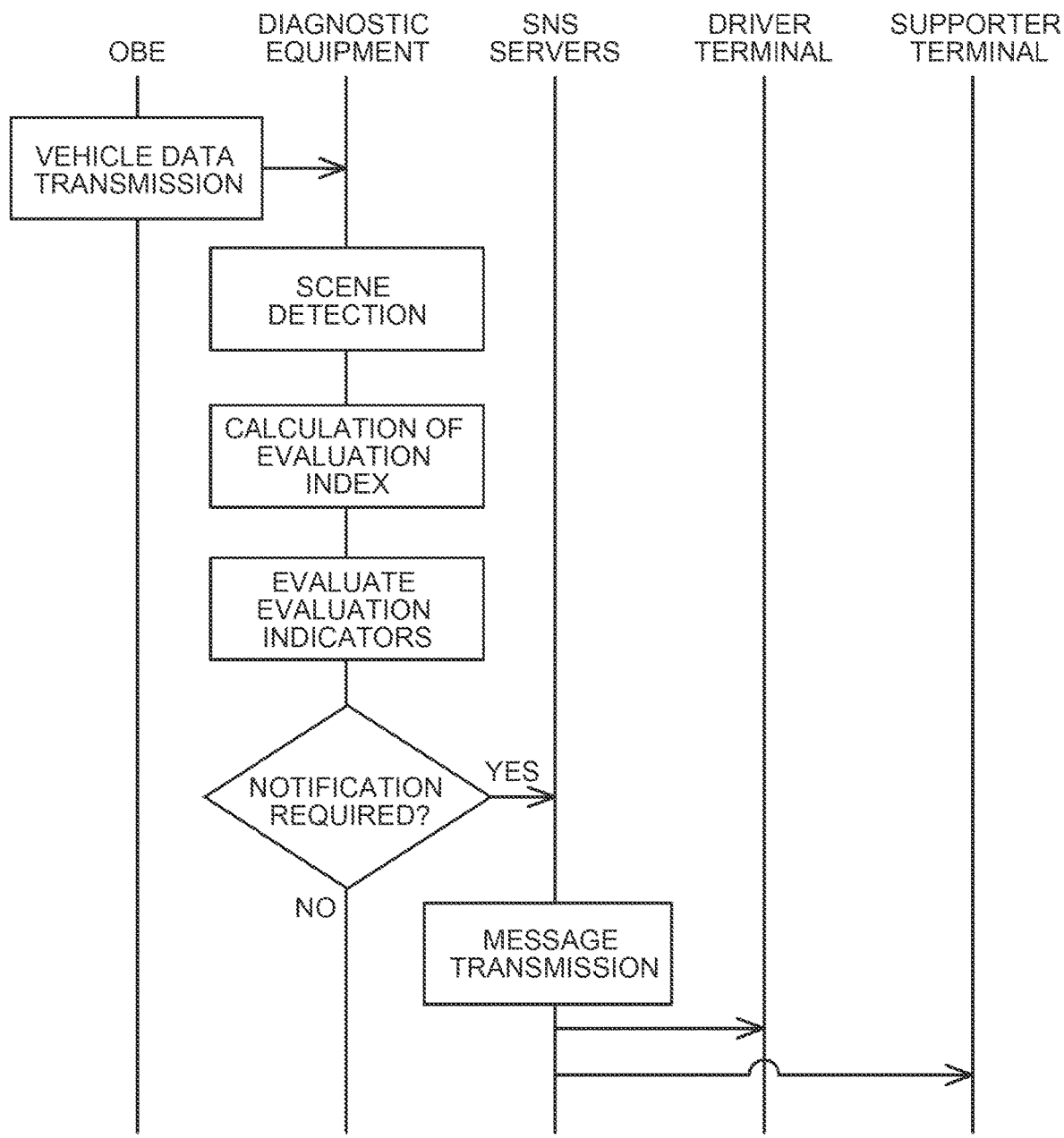
FIG. 6 is a diagram illustrating a flow of processing in the vehicle operation diagnosis system.

Next, a flow of processing in the vehicle operation diagnosis system 10 will be described with reference to FIG. 6. As illustrated in FIG. 6, the in-vehicle device 32 of the vehicle 30 periodically transmits data related to the operation of the vehicle 30 to the vehicle operation diagnosis device 12. The vehicle operation diagnosis device 12 analyzes the received vehicle data and detects a prescribed operation scene. When a prescribed operation scene is detected, the vehicle operation diagnosis device 12 acquires the number of retries or the required time in the operation scene as an evaluation index. The obtained evaluation index is stored and accumulated in the memory 16 together with the identification information of the corresponding operation scene. The vehicle operation diagnosis device 12 evaluates the operation capability of the driver based on the accumulated evaluation index. For example, the vehicle operation diagnosis device 12 calculates an evaluation score representing an operation capability from the evaluation index. Further, the vehicle operation diagnosis device 12 compares the evaluation score with a prescribed reference value.

In addition, the vehicle operation diagnosis device 12 determines whether or not notification of a message regarding the operation capability of the driver is necessary. For example, the vehicle operation diagnosis device 12 periodically notifies a message. In addition, the vehicle operation diagnosis device 12 determines that notification of a message is necessary when a specific feature (for example, an evaluation score is less than a reference value) appears in the evaluation score. When the notification of the message is required, the vehicle operation diagnosis device 12 requests the external SNS servers 26 to notify the message. In response to the request, the external SNS servers 26 notify the driver terminal 20 and the supporter terminal 22 of the message. By checking this message, the driver and the supporter can quickly grasp the state of the operating ability of the driver, the propriety of the vehicle driving by the driver, and the change in the physical condition of the driver. As a result, according to the technology disclosed in the present specification, it is possible to effectively prevent the occurrence of an accident and the deterioration of the physical condition of the driver.

Note that any of the configurations described above is an example, and other configurations may be changed as appropriate as long as the features described in claim 1 are provided. For example, in the above description, a message related to the evaluation index is notified to both the driver and the supporter. However, the message regarding the evaluation index may be notified only to one of the driver and the supporter. In addition, the message related to the evaluation index may be transmitted to UI device 42 mounted on the vehicle 30 instead of the information terminal owned by the user. In addition, the message may be notified to the user without using SNS.

What is claimed is:

1. A vehicle operation diagnosis device of a vehicle including a plurality of sensors and a user interface, the vehicle operation diagnosis device comprising a processor and a memory, wherein the processor is configured to:
   acquire, from the plurality of sensors, position data and operation data of the vehicle in real time;
   identify an operation scene of the vehicle prescribed in advance based on the acquired position data and the acquired operation data, the operation scene including at least one of passage of an intersection, a lane change, a lane merger, entry into a road from outside the road, passage of a stop line, or parking;
   determine, based on the acquired position data, a total number of times that the vehicle enters and exits a predetermined area corresponding to the identified operation scene;
   determine, based on the acquired operation data, a total number of retries of a vehicle operation corresponding to the identified operation scene;
   determine, based on the acquired operation data, a time required for the vehicle operation corresponding to the identified operation scene;
   evaluate an operation ability of a driver of the vehicle based on an evaluation index, the evaluation index including the total number of times that the vehicle enters and exits the predetermined area, the total number of retries of the vehicle operation, and the time required for the vehicle operation;
   store the evaluation index and the operation ability of the driver in the memory;
   display, via the user interface, a graph indicating a change history of the operation ability of the driver;
   compare an evaluated value of the operation ability of the driver with a predetermined reference value; and
   notify, via the user interface, a message prompting attention to the vehicle operation in a case where the evaluated operation ability of the driver is less than the predetermined reference value.

2. The vehicle operation diagnosis device according to claim 1, wherein the processor is configured to evaluate the operation ability of the driver based on the evaluation index, the evaluation index further including a total number of times of steering to a movement start lane performed after steering to a movement target lane for the lane change or the lane merger.

3. The vehicle operation diagnosis device according to claim 1, wherein:
   the operation scene includes at least one of getting on or off the vehicle, filling the vehicle with energy, and switching from autonomous driving to manual driving.

4. The vehicle operation diagnosis device according to claim 1, wherein the processor is configured to:
   evaluate variations in the operation ability of the driver based on a comparison between a current evaluation index and a previous evaluation index of the driver.

5. The vehicle operation diagnosis device according to claim 1, wherein the processor is configured to
   compare the evaluated value of the operation ability of the driver with a plurality of predetermined reference values set in stages; and
   notify, via the user interface, the message prompting attention to the vehicle operation upon each determination that the evaluated value falls below any one of the plurality of predetermined reference values.

6. The vehicle operation diagnosis device according to claim 1, wherein the processor is configured to
   compare the evaluated value of the operation ability of the driver with a plurality of predetermined reference values set in stages; and
   notify, via the user interface, a message praising improvement in the operation ability upon each determination that the evaluated value exceeds any one of the plurality of predetermined reference values.

\* \* \* \* \*